(12) United States Patent
Burch et al.

(10) Patent No.: US 7,047,113 B1
(45) Date of Patent: *May 16, 2006

(54) GPS NAVIGATION DEVICE

(75) Inventors: Matthew C. Burch, Lawrence, KS (US); Jay Dee Krull, Olathe, KS (US); David C. Brown, Olathe, KS (US); Cliff Pemble, Olathe, KS (US)

(73) Assignee: Garmin Ltd., (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/242,548

(22) Filed: Oct. 3, 2005

Related U.S. Application Data

(63) Continuation of application No. 11/035,342, filed on Jan. 13, 2005, which is a continuation of application No. 10/397,638, filed on Mar. 26, 2003, now Pat. No. 6,865,453.

(51) Int. Cl.
*G05D 1/00* (2006.01)

(52) U.S. Cl. .................. 701/4; 701/3; 701/14; 244/1 R
(58) Field of Classification Search ................ 701/3, 701/4, 14, 200–202, 211; 340/988, 995.1, 340/967, 973; 345/10; 244/1 R
See application file for complete search history.

(56) References Cited

U.S. PATENT DOCUMENTS

| | | | |
|---|---|---|---|
| 6,112,141 A | 8/2000 | Briffe et al. .................. 701/14 |
| 6,381,519 B1 | 4/2002 | Snyder .......................... 701/3 |
| 6,389,333 B1 | 5/2002 | Hansman et al. .............. 701/3 |
| 6,405,107 B1 | 6/2002 | Derman ......................... 701/3 |
| 6,633,810 B1 | 10/2003 | Qureshi et al. ............. 701/206 |
| 6,693,559 B1 | 2/2004 | Gyde et al. ................. 340/974 |
| 6,696,980 B1 | 2/2004 | Langer et al. .............. 340/971 |
| 6,702,229 B1 | 3/2004 | Anderson et al. ........... 244/1 R |
| 6,865,453 B1 | 3/2005 | Burch et al. ................... 701/4 |

OTHER PUBLICATIONS

U.S. Appl. No. 11/035,342, filed Jan. 13, 2005, Burch et al.
Garmin GNS 430/430A Pilot's Guide & Reference, Version 4.0, copyright 1998-2003, published Apr., 2003, 195 pages.
Garmin GNS 530/530A Pilot's Guide & Reference, Version 4.0, copyright 2001-2003, published Apr., 2003, 189 pages.

*Primary Examiner*—Yonel Beaulieu
(74) *Attorney, Agent, or Firm*—David L. Terrell

(57) ABSTRACT

A navigation device for navigating a vehicle to a point comprises a GPS receiver for receiving GPS signals, a processor connected with the receiver for processing the GPS signals, navigation data created by the processor, and a display page. The navigation data includes ground speed, altitude, vertical speed and rate of turn information, and the display page presents this information in individual graphic, circular displays representative of an aircraft instrument panel.

20 Claims, 3 Drawing Sheets a primary instrument to maintain a specified altitude, they are used in flying along a particular course to an intended destination. Mechanical instruments used for flying along a particular course include a directional gyro (DG) and a horizontal situation indicator (HSI). A DG conveys heading information via a rotating disc bearing a compass rose and a fixed pointer or lubber line indicating on the disc the heading that an aircraft is flying. An HSI integrates a DG with a combined course and deviation indicator used to indicate the intended course and deviation in degrees from the course. As with a mechanical altimeter, a mechanical DG or HSI is relatively easier to read than its digital counterpart.

GPS NAVIGATION DEVICE

RELATED APPLICATIONS

The present application is a continuation and claims priority benefit of an earlier-filed U.S. patent application entitled "GPS NAVIGATION DEVICE", Ser. No. 11/035,342, filed Jan. 13, 2005, which is a continuation and claims priority benefit of an earlier-filed U.S. patent application entitled "GPS NAVIGATION DEVICE", Ser. No. 10/397,638, filed Mar. 26, 2003, now U.S. Pat. No. 6,865,453. The above-identified applications are hereby incorporated by reference into the present application.

BACKGROUND OF THE INVENTION

The present invention relates to a global positioning system (GPS) navigation device used for navigating a vehicle to a waypoint. More particularly, the invention is directed toward a navigation device that may be used for navigating an aircraft while providing aircraft instrument style displays.

Over past several decades, GPS based navigation devices have been increasingly used for navigation of vehicles along airways, waterways and roadways. This is as a result of the relative compactness, lightweight, reliability and accuracy of these devices compared to traditional navigational aids such as UHF and VHF receivers.

In the aviation industry, such prior art devices have been offered as fixed mounted units, commonly mounted in the panel of an aircraft. Other prior art devices have been configured for portability, allowing a user to move the device from one aircraft to another without an expensive installation. Such portable and fixed-mounted GPS navigation devices generally offer various display page options, including moving-map displays, and digital displays of navigation data. While these displays convey a great amount of information in a small amount of space, they are vastly different in style and more difficult to read than the mechanical aircraft instruments, such as altimeters and rate of climb indicators, that are common to aircraft, especially aircraft used to train new pilots.

Mechanical aircraft instruments often provide a circular plate bearing a circumferential scale and an indicator, such as a needle, pivotally mounted at the center of the plate. One advantage that these older instruments, such as an altimeter, have when compared to newer electronic instruments having digital readouts is that a pilot is able to glance at the older instrument and quickly understand a flight characteristic. For example, clockwise movement of the needle, in an altimeter, would mean that the aircraft is climbing. Conversely, counter-clockwise movement of the needle indicates a descent. The speed of needle movement is also directly proportional to the rate of climb or descent.

In the case of a digital readout of altitude, a pilot may perceive a climb or descent by noticing that the readout is changing, but the pilot would have to read and understand the digits displayed to determine if the aircraft was climbing or alternatively descending. Such an action diverts the pilot's attention away from other flight instruments and is more time consuming when compared to noticing the clockwise or counter-clockwise movement of a mechanical instrument. This may result in a delay in initiating corrective action, for example, if the aircraft began a descent when level flight was desired.

While GPS navigation devices are not commonly used as a primary instrument to maintain a specified altitude, they The prior art navigation devices do not address the need for providing a display option that presents navigation data in a mechanical aircraft instrument style for relative ease in understanding certain flight characteristics, such as track, altitude, rate of turn and rate of climb or descent. In addition, the prior art does not address the need for a navigation device configured for use in various applications such as aviation, marine and automotive applications.

SUMMARY OF THE INVENTION

A navigation device for navigating a vehicle to a waypoint broadly comprises a GPS receiver for receiving GPS signals, a memory, a processor connected with the receiver for processing the GPS signals, navigation data created by the processor, and a display page. The navigation data includes ground speed, altitude, vertical speed and rate of turn information, and the display page presents this information in individual graphic, circular displays representative of an aircraft instrument panel.

The ground speed display and the rate of turn display are positioned along the left hand side of the display page with the ground speed display placed above the rate of turn display. The altitude and rate of climb displays are positioned along the right hand side of the display. The altitude display is positioned above the rate of climb display.

The navigation data also includes track information corresponding to movement of the device along a track. The track information is presented in a graphic, circular display near the middle of the display page. As a result, the display page resembles a standard aircraft instrument panel.

In an alternative form, the device is portable and may be placed in an air, water or land mode where the display page displays information directed toward aeronautical navigation, marine navigation or automotive navigation, respectively. For example, in the air mode, a graphic, circular track display, as discussed above, is presented on the display page. Cartographic data stored in the memory of the device may also be displayed on the display page in the form of a moving aeronautical-type map indicating progress toward the point.

The water mode includes the cartographic data displayed on the display page in the form of a nautical-type map, and a selected set of the navigation data presented on the display page in individual digital displays. Finally, in the land mode, the navigation data includes directional information. The directional information is presented on the display page in a written form providing a user with written directions in order to proceed along roadways to the point.

BRIEF DESCRIPTION OF THE DRAWINGS

These and other features, advantages and objects will appear from the following detailed description when considered in connection with the accompanying drawings in which similar reference characters denote similar elements throughout the several views wherein.

DETAILED DESCRIPTION OF THE PREFERRED EMBODIMENTS

Figure 1:
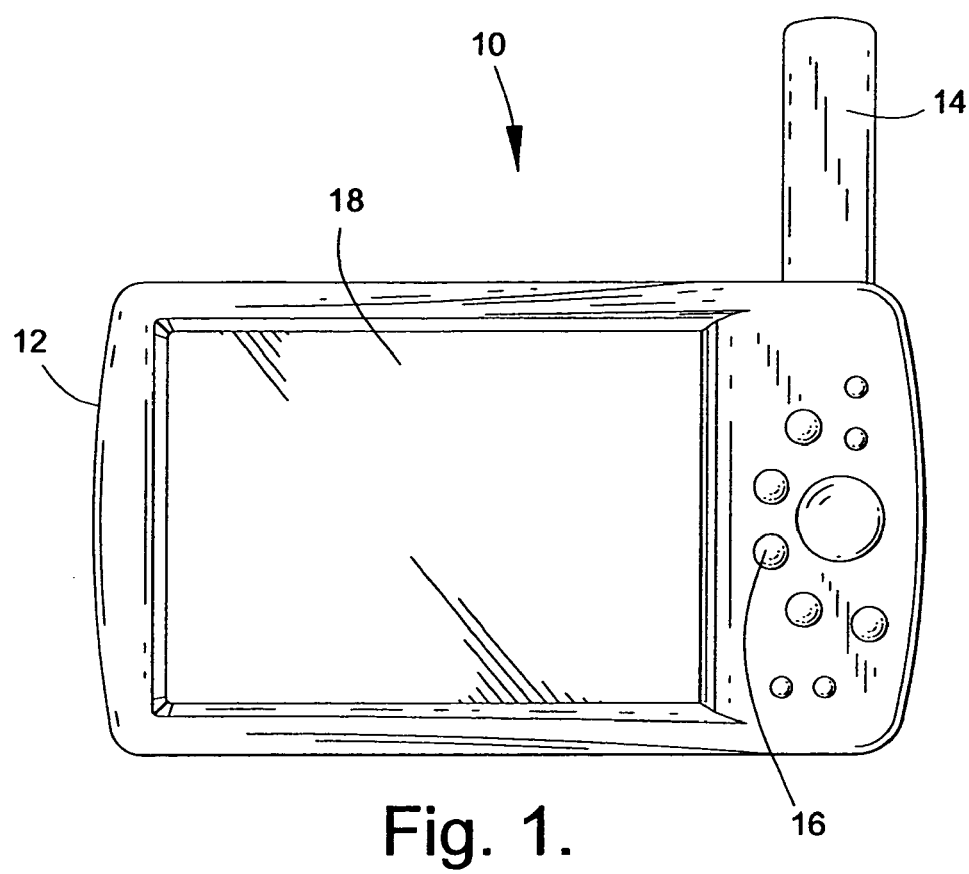
FIG. 1 is a front perspective view of a GPS-based navigation device constructed in accordance with the present invention.
Figure 2:
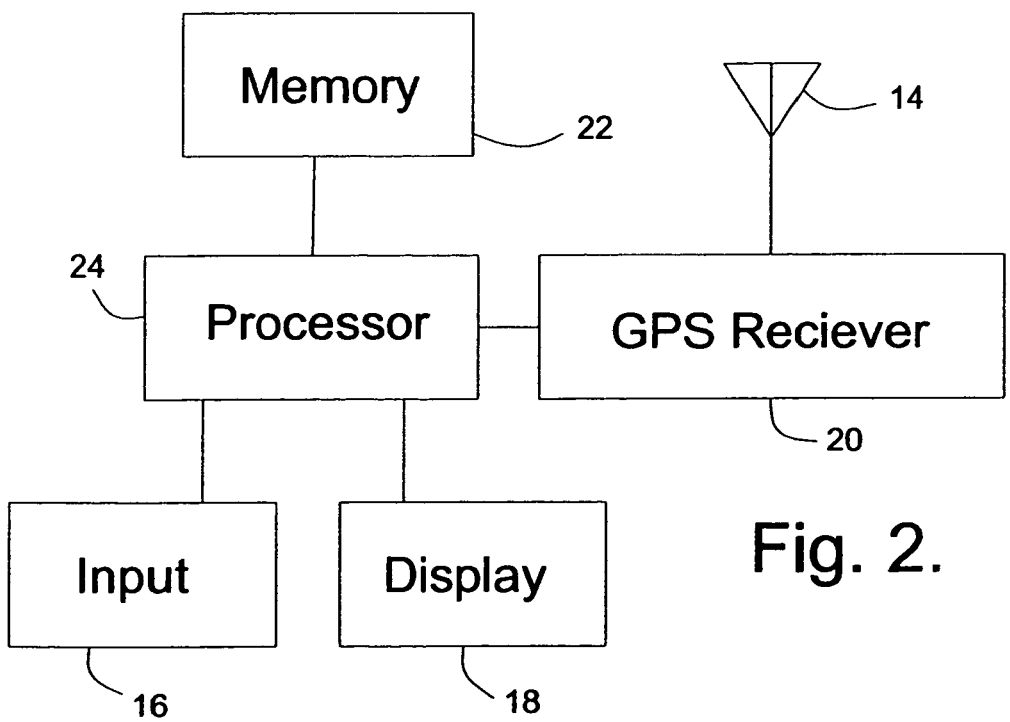
FIG. 2 is a circuitry block diagram of the device of FIG. 1.

Referring now to FIG. 1, a preferred embodiment 10 of a GPS navigation device is shown for navigating a vehicle to a waypoint. The preferred device 10 broadly includes a portable housing 12, antenna 14, input keypad 16 and a liquid crystal display (LCD) screen 18. The screen 18 is generally rectangular. As shown in a circuitry block diagram in FIG. 2, the internal components of the device 10 include a GPS receiver 20 for receiving GPS signals via the antenna 14, a memory 22 for storing cartographic data, and processor 24 connected with the receiver 20 for processing the GPS signals.

Figure 3:
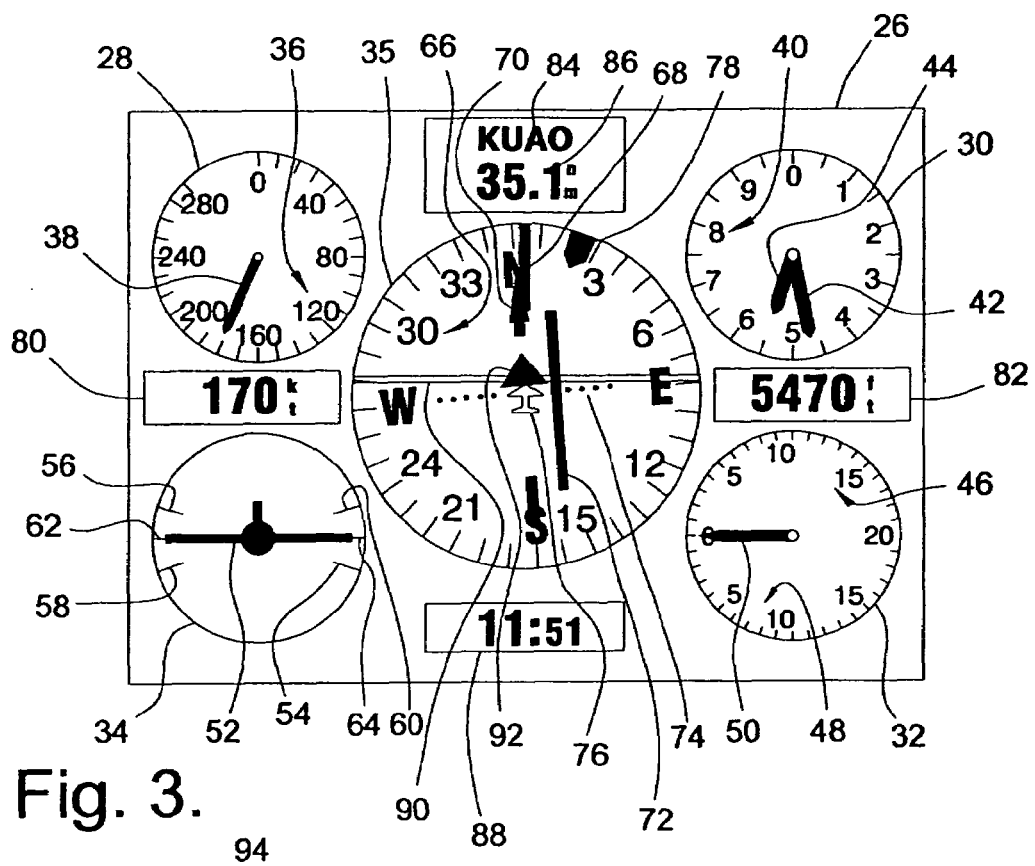
FIG. 3 is a front view of an instrument panel page of device in an aviation mode.

Navigation data is created by the processor for selective presentation on the display screen 18. The navigation data includes ground speed, altitude, rate of climb, rate of turn and track information. Through manipulation of the keypad 16, a user may select the format for displaying information on the screen 18. The instrument panel page 26 shown in FIG. 3 is one such format. The panel page 26 presents the ground speed, altitude, rate of climb and rate of turn information in four separate, graphic, circular displays 28, 30, 32 and 34, respectively. The panel page also presents the track information in a centrally positioned track display 35.

The ground speed display 28 is located in the upper left hand corner of the panel page 26 and includes a circumferential ground speed scale 36 and a ground speed pointer 38. The pointer 38 indicates the ground speed of the device 10 as determined by the processor 24. In FIG. 3, the ground speed of the device 10 is approximately 170 knots (nautical miles per hour). While the ground speed display 28 has the appearance of a conventional airspeed indicator, it is important to note that the display 28 merely shows the speed of the device 10 over the ground rather than the airspeed. The airspeed of an aircraft determines the performance characteristics of the aircraft whereas ground speed is simply airspeed corrected for wind currents.

The altitude display 30 has the appearance of a mechanical aircraft altimeter and includes a circumferential altitude scale 40, a 100 foot pointer 42 and a 1000 foot pointer 44. The altitude display 30 is read like an altimeter, and is positioned in the upper right hand corner of the panel page 26, as is standard for an altimeter. In FIG. 3, the altitude display 30 reads approximately 5,470 feet. It will be appreciated that the altitude indicated by the altitude display 30 is the actual altitude of the device 10 above mean sea level, rather than its pressure or density altitude, and thus is independent of pressure or temperature considerations.

The rate of climb display 32 includes a circumferential climb scale 46 located on the upper half of the display 32, and a circumferential descent scale 48 located on the lower half of the display 32. A pointer 50 indicates the rate of climb or descent of the device 10, and, therefore, the craft in which the device 10 is used. The vertical speed of the device 10 indicated by the pointer 50 is determined by the processor 24 using the GPS signals received by the receiver 20, rather than sensing and intepreting changes in atmospheric pressure as in a conventional mechanical rate of climb indicator. The display 32 does, however, read like a conventional mechanical rate of climb indicator. The numbers on each of the scales 46, 48 are in hundreds of feet, i.e. 500 feet, 1000 feet, 1,500 feet, etc. The display 32 is located in the lower right hand corner of the panel page 26.

A vertical speed bug may be shown on the display 32. The position of the vertical speed bug is determined by the processor 24 using the GPS signals and represents the vertical speed of the device at its current ground speed required to reach a predetermined, user-selected distance from a waypoint at a predetermined, user-selected offset altitude, or height, above the elevation of the waypoint. For example, the bug may be positioned adjacent a 500 foot marking on the lower half of the display 32 to indicate that the device 10 is required to descend at a rate of approximately 500 feet per minute in order to arrive at the desired distance from the waypoint at the desired offset altitude. The distance and offset altitude are entered using the keypad 16. The elevation of waypoints, such as airports, is stored in the memory 22 of the device 10.

Many pilots desire to be at a certain height, such as one thousand feet, above an airport at a certain distance, such as five miles, from the airport prior to landing. This allows a pilot to properly slow an aircraft prior to entering the landing pattern at the airport without rapidly cooling its engine, which may lead to damaging the engine, or additional maneuvering of the aircraft, which results in lengthening flight time and added costs. This is typically referred to as a level off altitude.

It will be appreciated that the level off altitude is the elevation of the waypoint added to the offset altitude. By predetermining an offset altitude, rather than an actual level off altitude, a user is able to preplan a descent toward any of various waypoints, such as airports, of varying elevations. In the Kansas City area, for example, a 1,000 foot offset altitude may lead to an actual level off altitude of approximately 2,000 feet above sea level. However, in the Denver area, a 1,000 foot offset altitude may lead to an actual level off altitude of approximately 6,200 feet above sea level. As a result, by enabling a user to predetermine the offset altitude, the device 10 simplifies the process of planning a descent into various waypoints since the actual altitude of level off does not have to be calculated by the user for each different waypoint.

The bug is thus useful in planning a descent. For example, in use while in level flight the bug will command an increasing descent rate as the device 10 moves toward the waypoint. Once the bug is positioned at the desired descent rate, such as 500 feet per minute, the user simply begins a descent and increases the descent rate until the pointer 50 overlays the bug. While changes in ground speed of the device 10 will affect the position of the bug, by keeping the pointer 50 on top of the bug through altering the descent rate, the device 10 will arrive at the predetermined distance from the waypoint at the desired offset altitude.

There are instances where a user may be required to ascend or descend in order to pass a waypoint at a required actual altitude. The device 10 may alternatively be configured using the keypad 16 to provide vertical navigation resulting in passing a waypoint, or desired distance from the waypoint, at a pre-selected actual altitude. In aviation, such "crossings" are often required in mountainous terrain and in areas of heavy traffic. It will be appreciated that the bug is useful in providing guidance so that the user is able to pass the waypoint or selected distance from the waypoint at the desired actual altitude.

The rate of turn display 34 is positioned on the lower left hand corner of the panel page 26 and displays rate of turn information. The display 34 includes a pivoting aircraft indicator 52, opposed right turn marks 54, 56, and opposed left turn marks 58, 60.

When the device 10 is not turning, the indicator lines up with marks 62, 64. As the device 10 begins to turn, the indicator 52 pivots in the direction of the turn. In a right hand turn, for example, the indicator 52 pivots based on the rate of turn toward the right turn marks 54, 56. As the rate of turn reaches 1800 per minute, the indicator 52 lines up with marks 54, 56. Such a turn rate is referred to as a standard rate turn in the aviation community. The rate of turn is determined by the processor 24 and is based on a vector of acceleration of the device 10 perpendicular to the track of the device 10. It will be appreciated that the rate of turn display 34 does not indicate the angle of bank of the device 10.

The track display 35 includes a circumferential compass scale 66 of 10 through 3600 and a lubber line 68. The scale 66 rotates as the device 10 turns so that the lubber line 68 overlays the track of the device 10. In FIG. 3, the track display 35 is shown in the form of an HSI, and the device 10 is indicated as moving along a track of approximately 30.

The track display 35 also includes a course indicator 70 and a deviation indicator 72. A linear deviation scale 74 is presented on the track display 35 and is used in conjunction with the deviation indicator 72 to indicate the deviation of the device 10, represented by a position indicator 76, from the course. In this example, the course is shown to lie to the right of the device 10. A bug indicator 78 is configurable and is also provided on the track display 35 to indicate a track suggested by the processor 24 to be taken by the device 10 to return to the course and arrive at the waypoint.

It will be appreciated that the displays 28, 30, 32, 34 and 35 provide the general appearance of an aircraft instrument panel, and are able to readily disseminate useful navigation information to a user in a relatively easy to comprehend presentation. As a result, when using the device 10 for navigation, a user is able to gain additional navigational knowledge of the movement of the device 10 and thus the aircraft, or other vehicle, in which it is used.

Several digital displays are also provided on the panel page 26 to provide more detailed navigation data. A digital ground speed display 80 is positioned adjacent to the ground speed display 28 and provides a digital readout of the ground speed of the device 10. A digital altitude display 82 is positioned adjacent to the altitude display 30, providing a digital readout of the altitude of the device 10.

The waypoint to which the device 10 is being navigated is shown in a waypoint display 84. A digital distance display 86 indicates the distance from the device 10 to the waypoint. In addition, a time display 88 indicates the estimated time enroute to the waypoint from the present position of the device 10.

A vertical guidance indicator 90 is provided on the track display 35 to give the user vertical navigational guidance, such as when to begin descending to arrive at the waypoint at a designated altitude. The indicator 90 reads like a conventional glide slope indicator. A TO/FROM pointer 92 indicates whether the device 10 is moving toward the waypoint, as shown, or away from the waypoint.

Figure 4:
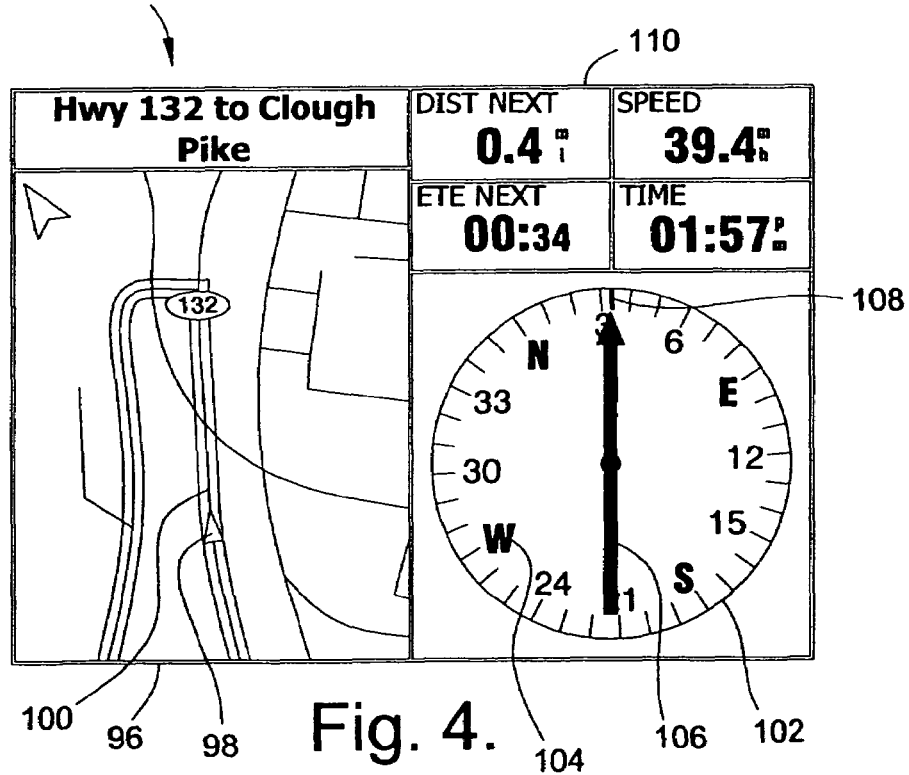
FIG. 4 is a front view of an instrument panel page of an alternative navigation device in an aviation mode.

In an alternative form, the device 10 includes selectable air, land and water modes of operation and cartographic data stored in the memory 22. An air mode display page 94 is shown in FIG. 4. The display page 94 includes a moving aviation map 96 depicting the area around the device 10 including special use airspace such as prohibited, restricted and alert areas, and other information commonly found on aviation charts. A position pointer 98 indicates the present position of the device 10 and points along the present track of the device. A course line may also be incorporated to illustrate the intended course of travel of the device 10 toward the waypoint.

A track display 102 is presented adjacent to the map 96 and includes a circumferential compass scale 104, a waypoint pointer 106 and a lubber line 108. The scale 104 rotates as the device 10 turns so that the lubber line 108 overlays the scale 104 to indicate the track of the device 10. The pointer 106 points along the scale 104 in the direction of the waypoint. While the track display 102 is similar in appearance and use as a mechanical radio magnetic indicator (RMI), it will be appreciated that a DG or HSI style display, such as display 35 may alternatively be used. A digital display 110 provides navigation data such as distance, ground speed, enroute time and actual time information.

Figure 5:
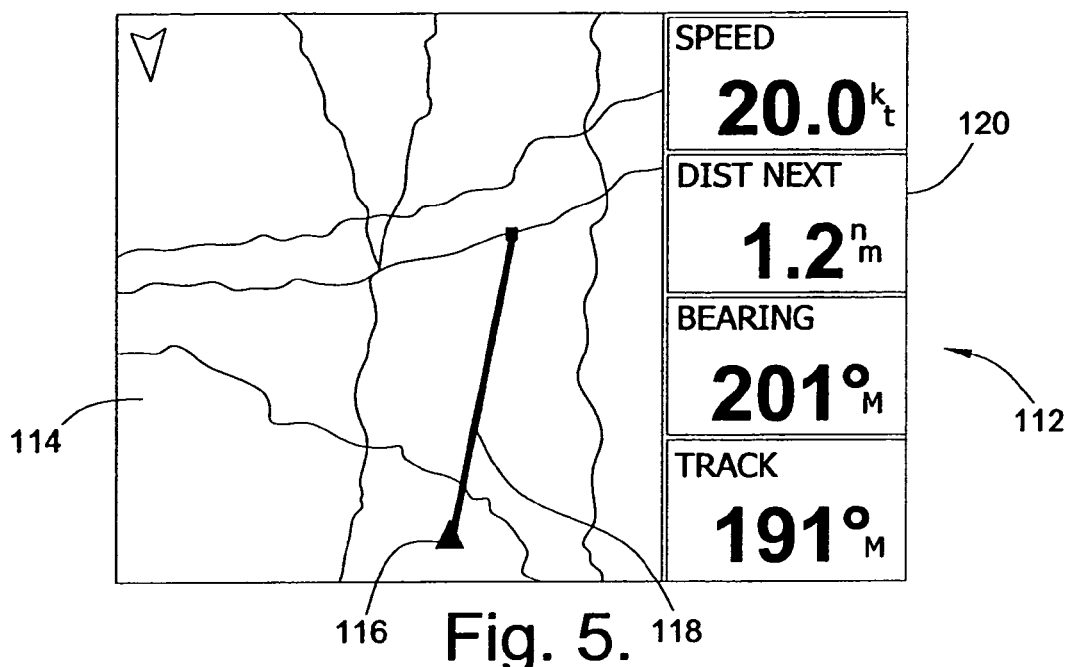
FIG. 5 is a front view of the display page of the device of FIG. 4 in the marine mode.

A water mode display page 112 is shown in FIG. 5. The display page 112 includes a moving marine map 114 detailing the area around the device 10 including soundings, hazards, land features and other information commonly found on marine charts. A position pointer 116 indicates the present position of the device 10 and points along the present track of the device 10. A course line 118 indicates the intended course of travel of the device 10 toward the waypoint. A digital display 120 provides navigation data such as speed over ground, distance to the waypoint, bearing to the waypoint and present track.

Figure 6:
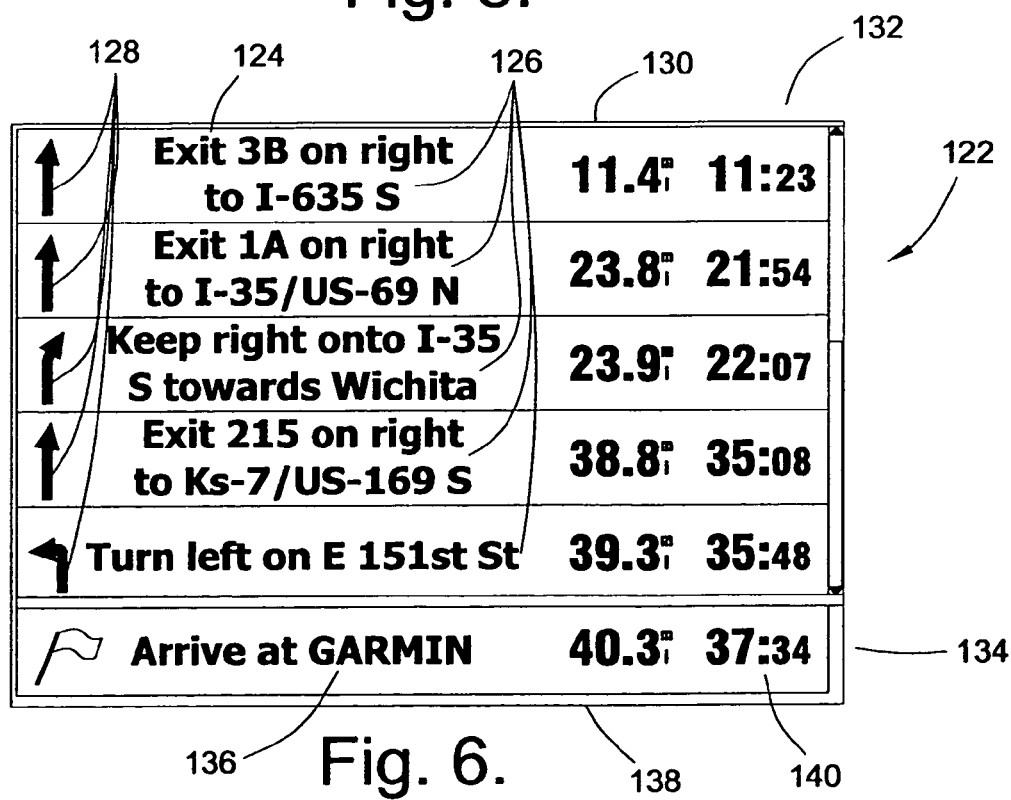
FIG. 6 is a front view of the display page of the device of FIG. 4 in the land mode.

In the land mode, the user may select the directions page 122 as shown in FIG. 6. The directions page 122 includes a column 124 of written directions 126 detailing the suggested course or method of proceeding toward the waypoint. Also provided adjacent to each direction 126 is a pointer 128 providing a visual indication of the direction of any impending turn.

A distance column 130 provides distance information representative of the distance along the course from the device 10 to the point of implementing the adjacent direction 126. A time column 132 provides the estimated time to travel along the course from the present position of the device 10 to the point of implementing the adjacent direction 126. A waypoint information row 134 is provided detailing the name 136 of the waypoint, the total travel distance 138 along the course to the waypoint, and the total travel time 140 to the waypoint.

As a result, the directions page 122 enables a user to review written directions 126 describing how to travel to a waypoint while providing continuous updates on the distance and time until implementation of the next direction 126. In addition, the page 122 disseminates graphically in the form of a pointer 128 the direction to turn for readily available reference by the user, further reducing the workload of a user while navigating along unfamiliar roadways.

It will be appreciated that the device 10 in its alternative form is configured for use in aviation, marine and automotive applications. For example, a user may use the alternative device 10 for navigation in an aircraft to an airport, and then remove the device 10 from the aircraft and use the device 10 for navigation along unfamiliar roadways to another destination. The same alternative device 10 may also be used for marine navigation. As a result, the relative costs to a user are reduced, and the convenience and utility are increased.

While the displays are shown in the English measurement system, any measurement system may be used, such as the metric system. In addition, while preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A navigation device for navigating a vehicle to a point, the device comprising:
   a GPS receiver for receiving GPS signals;
   a processor connected with the receiver for processing the GPS signals;
   navigation data created by the processor, the data including rate of turn information; and
   a display page for displaying the navigation data, the display page presenting the rate of turn information.

2. The navigation device as set forth in claim 1, wherein the navigation device is portable.

3. The navigation device as set forth in claim 1, wherein the display page further presents individual digital displays of ground speed and altitude information.

4. The navigation device as set forth In claim 1, wherein the navigation data includes distance information corresponding to the distance between the device and the point, and the display page further presents the distance information.

5. The navigation device as set forth in claim 1, wherein the navigation data further includes track information corresponding to movement of the device along a track, and the rate of turn information is based on a vector of acceleration of the device perpendicular to the track.

6. The navigation device as set forth in claim 1, wherein the navigation data Includes track and course information and the display page presents the track information in a graphic, circular track display including a compass rose depiction, and presents the course information in an integrated course line and course deviation indicator.

7. The navigation device as set forth in claim 6, the device and the point defining a route, the track display including a pointer positioned on the compass rose depiction representing the mute.

8. The navigation device as set forth in claim 6, wherein navigation data includes vertical navigation information and the display page presents the vertical navigation information on the track display.

9. The navigation device as set forth in claim 1, wherein the navigation data includes track and course information and the display page presents the track information in a graphic, ar-shaped track display including a portion of a compass rose, and presents the course information in an integrated course line and course deviation indicator.

10. A navigation device for navigating a vehicle to a point, the device comprising:
    a GPS receiver for receiving GPS signals;
    a processor connected with the receiver for processing the GPS signals;
    navigation data created by the processor using the GPS signals, the data including rate of turn information and vertical speed information; and
    a display page for displaying the navigation data, the display page presenting the rate of turn information and vertical speed information.

11. The navigation device as set forth in claim 10, wherein the navigation data includes vertical navigation information representative of a vertical speed required to arrive at the point at a predetermined height above the point, and the display page presents the vertical navigation information on the vertical speed display.

12. The navigation device as set forth in claim 10, wherein the navigation data includes vertical navigation information representative of a vertical speed required to arrive at the point at a predetermined attitude, and the display page presents the vertical navigation information on the vertical speed display.

13. The navigation device as set forth in claim 10, wherein navigation device is portable.

14. The navigation device as set forth in claim 10, wherein the navigation data further includes ground speed and altitude information.

15. The navigation device as set forth in claim 14, wherein the ground speed and altitude information are presented on the display page.

16. The navigation device as set forth in claim 14, wherein the ground speed and altitude information are presented on the display page in individual graphic ground speed and altitude displays.

17. The navigation device as set forth in claim 10, wherein the navigation data further includes track information corresponding to movement of the device along a track, and the rate of turn information is based on a vector of acceleration of the device perpendicular to the track.

18. The navigation device as set forth in claim 10, wherein the navigation data includes track and course information and the display page presents the track information in a graphic, circular track display including a compass rose depiction, and presents the course information in an integrated course line and course deviation indicator.

19. The navigation device as set fort in claim 10, wherein the rate of turn information is based on a vector of acceleration of the navigation device perpendicular to a track of the navigation device.

20. The navigation device as set forth in claim 10, wherein the rate of turn information is displayed with a pivoting aircraft indicator, opposed right turn marks, and opposed left turn marks.

* * * * *